July 3, 1928.
A. KOLODY
AEROPLANE STEERING DEVICE
Filed May 1, 1926    2 Sheets-Sheet 2
1,675,935
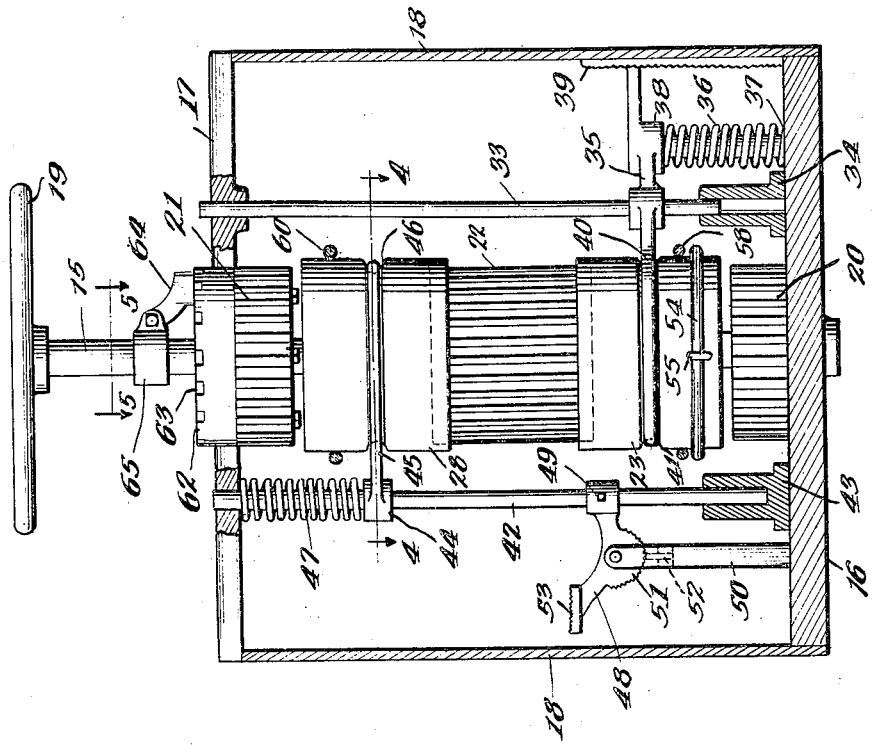
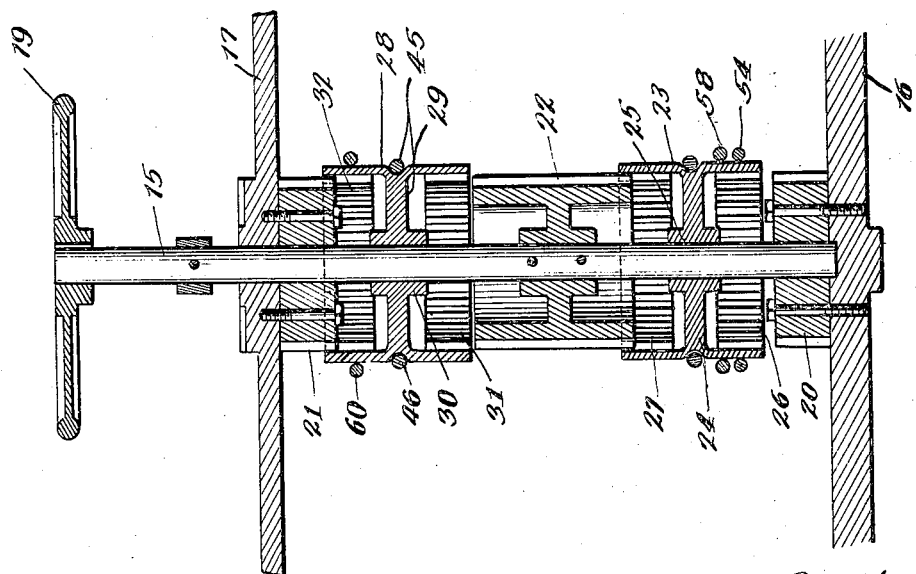

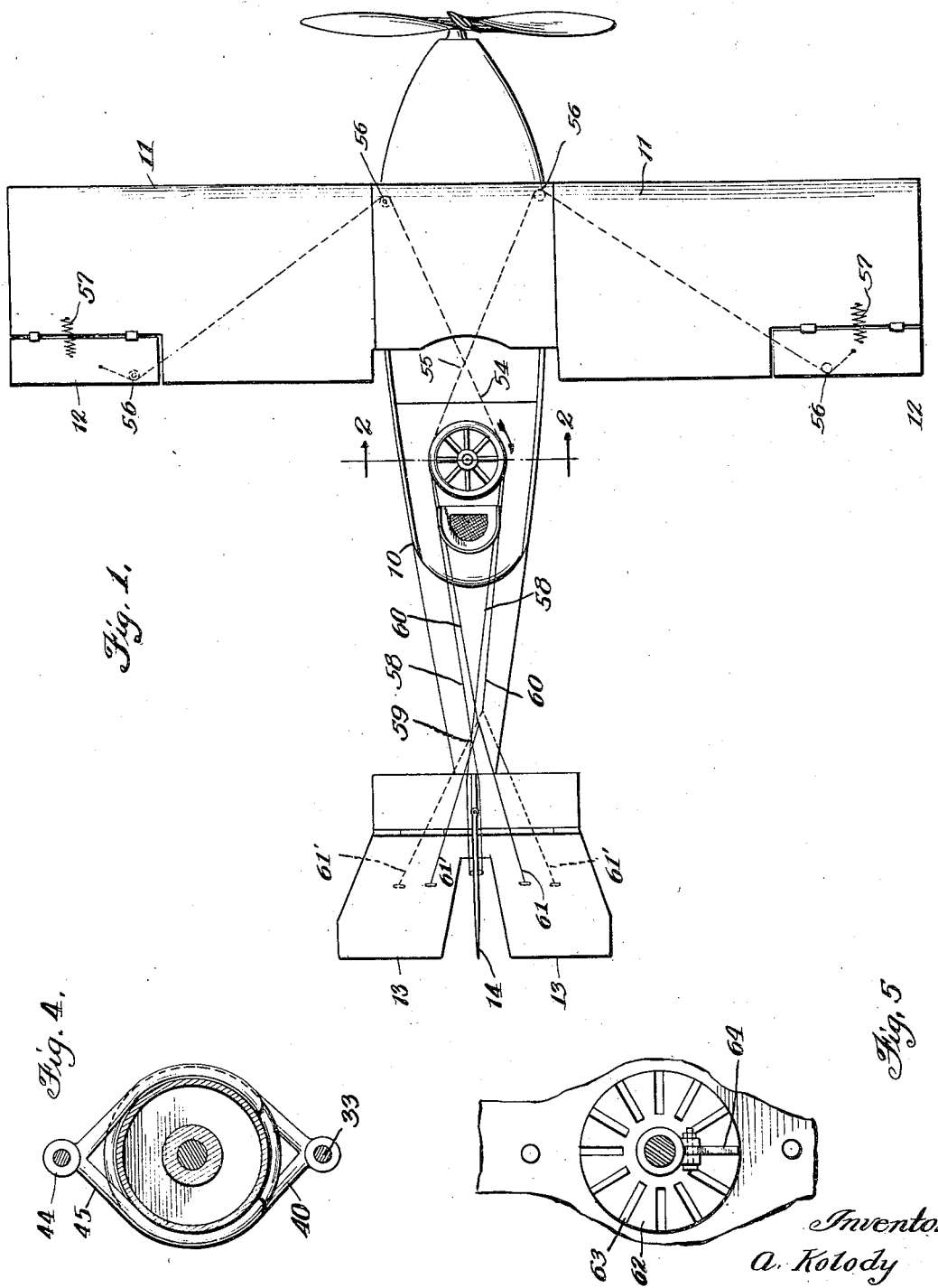

Patented July 3, 1928.

1,675,935

UNITED STATES PATENT OFFICE.

ANDREW KOLODY, OF CHICAGO, ILLINOIS.

AEROPLANE STEERING DEVICE.

Application filed May 1, 1926. Serial No. 106,118.

The invention relates to aeroplane steering mechanisms, its principal object being the provision of positive means for holding the ailerons, rear planes and rudder in adjusted position.

It is a known fact that in the usual steering mechanism the pilot must give constant attention thereto and his arms and feet are always occupied in holding the mechanism in position. Therefore, another object of the present invention is the provision of a steering mechanism for aeroplanes whereby the operator, upon adjusting the ailerons, rudder and rear planes, may lock them in adjusted position, and then be free to perform other duties than steering.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Fig. 1 is a top elevational view of an aeroplane showing the cables controlled by the present invention;

Fig. 2 is a transversal cross-sectional view through the fuselage, taken on line 2—2 of Fig. 1, showing the steering mechanism in elevation;

Fig. 3 is a longitudinal sectional view through the steering mechanism;

Fig. 4 is a transversal cross-sectional view of the steering mechanism on line 4—4 of Fig. 2; and Fig. 5 is the top plan view of the locking means taken on line 5—5 of Fig. 2.

Referring in detail to the drawings there is shown on Fig. 1 an aeroplane having a conventional fuselage 10, planes 11 and ailerons 12. Pivotally mounted at the rear end of the fuselage 10 are the rear planes 13 and rudder 14.

The steering mechanism constituting the present invention is positioned within the fuselage and embodies the steering shaft 15 resting upon the floor 16 of the fuselage. The said shaft is laterally supported by brace 17 which is mounted upon the side walls 18 of the fuselage 10, the shaft at its upper end being provided with the usual steering wheel 19.

Rigidly mounted upon the floor 16 is gear 20 and rigidly mounted on the undersurface of brace 17 is gear 21. Shaft 15 passes through both of said gears and is adapted for rotary movement therewithin as plainly seen on Fig. 3. At the central point intermediately of the two mentioned gears 20 and 21 the shaft is provided with a rigidly mounted gear 22 which is adapted for rotary movement with said shaft.

A lower drum 23 is loosely positioned around the shaft 15 by the diaphragm 24 and central sleeve 25. The lower portion of said drum 23 is provided with an internal gear 26 adapted to engage with gear 20, while the upper portion of said drum is provided with a similar internal gear 27 adapted to engage with gear 22. Drum 28 of like construction having diaphragm 29, and sleeve 30 is disposed upon shaft 15 above gear 22. The lower portion of said latter drum has an internal gear 31 adapted to engage gear 22, and the upper portion thereof has an internal gear 32 adapted to engage gear 21.

The spaces between the stationary gears 20 and 21 and the gear 22 are smaller than the heights of drums 23 and 28, respectively, therefore, said drums are at all times in positive engagement either with said gears 20 and 21, respectively, or with the gear 22. From the described construction shown on Figs. 2 and 3 it will be seen that the drums 23 and 28 are adapted for longitudinal shifting upon the shaft 15. Normally both drums remain in engagement with the gear 22 as shown on Fig. 2.

The mechanism for shifting drum 23 out of engagement with gear 22 into engagement with gear 20 includes an upright guide post 33 slidably mounted within brace 17. The lower end of said post is positioned within bearing 34 which is rigidly mounted upon floor 16, the post 33 being adapted for upright sliding movement within said bearing as is apparent from Fig. 2. Foot bar 35 is rigidly mounted upon said post 33 and is under an upward tension by coil spring 36 encircling standard 37 and interposed between floor 16 and said foot bar. Integrally formed with said foot bar 35 is a collar 38 which is adapted for upright sliding movement upon said standard 37. The end of foot bar 37 adjacent the upright wall 18 of fuselage 10 is in contact with reticulated upright bar 39 rigidly mounted upon said wall. Said end of the foot bar is adapted for frictional movement upon said reticulated bar for facilitating the shifting of drum 23 by pilot's foot. The inner end of the foot bar 35 is provided with fork 40 remaining within circular groove 41 made centrally on the outer periphery of the drum 23.

The operating mechanism for drum 23 hereinabove described is adapted to shift drum 23 on a vertical line, but does not interfere with the rotary movement of the drum. Spring 36 exerts an upward pressure upon foot bar 35 and consequently normally tends to hold drum 23 in engagement with gear 22.

The operating mechanism for the upper drum 28 includes a guide post 42 adapted for sliding movement within brace 17 and is slidably positioned within bearing 43 which is mounted upon floor 16. Rigidly mounted upon said post 42 is a collar 44 which has integrally formed fork 45 positioned within circular groove 46 on drum 28 as plainly seen on Figs. 2 and 4. A coil spring 47 encircling said post 42 and interposed between brace 17 and collar 44 normally tends to hold drum 28 in engagement with gear 22. For the purpose of moving post 42 upwardly in order to bring drum 28 into engagement with stationary gear 21 a foot lever 48 is rigidly mounted upon post 42 as at 49, said lever being pivoted within bifurcated end of support 50. Portion of said lever 48 directly below the pivot point is enlarged into a segment 51 having a roughened edge for frictionally riding upon plate 52 which is positioned transversely of said segment 51 within the bifurcated end of said support 50 as plainly seen on Fig. 2. The outer end of said lever 48 is provided with a foot rest 53 for operating the lever by the pilot's left foot.

Lower drum 23 carries a cable 54 which at its central point is affixed to the drum by means of clamp 55 preventing downward or upright creeping movement as well as any shifting of the cable independently of the drum. The cable is crossed as at 55 and the ends thereof are affixed to the lower faces of the two ailerons as shown on Fig. 1. A plurality of pulleys 56 facilitate the operation of said cable.

It is observed that each aileron 12 is pivotally mounted to its respective plane and spring 57 affixed by its one end to the aileron and by the other to the plane tends to raise each aileron. When, however, cable 54 is positioned upon a drum 23 in such a manner that the center thereof remains in parallel relation on vertical plane with the longitudinal axis of the aeroplane, the position assumed on Figs. 1 and 2, both ailerons will remain in alinement with the respective planes 11, or in other words cable 54 will hold the ailerons in equilibrium against the pull of springs 57 thereupon. When drum 23, remaining in engagement with gear 22, is turned by means of the steering wheel 19 in the direction of the arrow on Fig. 1, the end of cable 54 remaining on the left side of the aeroplane will naturally become shorter and will draw the left aileron downwardly against the tension of its respective spring 57. At the same time the end of cable 54 remaining on the right side of the aeroplane will become longer, as is obvious, permitting the right spring 57 to exert a pull upon the respective aileron in order to raise it. In this assumed case the left aileron will be tilted downwardly and will be disposed angularly in respect of its plane on its pivot point. Of course, the right spring 57 will exert a pulling tension upon its cooperating aileron, but in flight the resistance of air will counteract the tension of the spring and will tend to hold the aileron flush with its plane.

Drum 23 further carries cable 58 which is firmly affixed to the drum on the diametrically opposite point from clamp 55 by a similar clamp, which is not shown on the drawings. Said cable 58 runs rearwardly, the two halves of the cable crossing as at 59, and the ends of the cable are attached to the opposite faces of the rudder 14 as plainly seen on Fig. 1.

Said cable 58 is adapted for simultaneous operation with cable 54 on rotating drum 23. On rotating drum 23 in the direction of the arrow on Fig. 1 the end of cable 58 remaining on the right side of rudder 14 will exert a pulling action upon the rudder in the right direction while the other end of the cable will become prolonged permitting unimpeded action of the end of cable 58 associated with the right side of the rudder 14.

In said assumed case, where the drum 23 is rotated in the direction of arrow on Fig. 1, the left aileron, being downwardly tilted, will offer a resistance to the air causing elevation of the left plane, and the rudder being at the same time disposed to the right will cause the aeroplane to travel in the right arcuate line. Turning the drum 23 to the opposite direction from that indicated by arrow on Fig. 1 will cause the aeroplane to travel in an arcuate line to the left. By bringing the drum to a neutral position, that is to such a position that the line running through the center points of cables 54 and 58 remains parallel to the longitudinal axis of the aeroplane, the position assumed in Figs. 1 and 2, the aeroplane will traval in a straight line on horizontal plane.

From the hereinabove description it will be apparent that drum 25 controls the flight of the aeroplane on horizontal plane.

For controlling the aeroplane on a vertical plane cable 60 is passed around drum 28 and is affixed thereto by a clamp like one indicated by 55. One half of said cable 60 by its branches 61 is affixed to the upper face of the rear plane 13, while the other half by its branches 61' is affixed to the lower face of said plane. By turning drum 28 in the direction of arrow on Fig. 1 the rear plane 13 will be tilted upwardly causing the ascent of the aeroplane and on turning said drum in the opposite direction the descent of the aeroplane will be affected. In adjusting said drum 28 to a neutral position so that the center of the cable 60 remains on a parallel line with the longitudinal axis of the aeroplane on vertical plane the flight of the aeroplane on vertical plane will not be affected.

Assuming that drum 28 is in a neutral position and in engagement with the gear 21 as on Fig. 3, and it is desired to steer the aeroplane horizontally, the steering wheel 19 is turned in the desired direction rotating drum 23 through the medium of gear 22. Thereupon the pressure on lever 48 is released and spring 47 will bring drum 28 into engagement with gear 22. To maintain the direction of aeroplane in accordance with the adjustment of the two drums an arcuate plate 62 integrally formed with brace 17 is provided. Said plate surrounds shaft 15 and has radially arranged notches 63 which cooperate with plate 64 to hold the shaft rigidly against rotation in its adjusted position. Said latter plate 64 is pivoted in collar 65 rigidly mounted upon the shaft. When it is desired to operate the shaft the plate 64 is raised and removed from engagement with plate 62 in notches 63.

When it is desired to steer the aeroplane on a vertical plane drum 23 is thrown into engagement with gear 20, the plate 64 is removed from engagement with the arcuate plate 62 and the shaft 15 is turned into a desired direction for adjusting the rear plane 13 through the medium of drum 28.

From the hereinabove description it will be apparent that by causing cooperation of the two drums combination of flight on horizontal and vertical planes will be affected.

While there is described herein a preferred embodiment of the present invention, it is nevertheless to be understood that minor changes may be made therein without departing from the spirit and scope of the invention as claimed.

What I claim as new is:

1. In an aeroplane having a rudder, front planes including ailerons, rear planes, and fuselage, including the floor and side walls, the steering mechanism comprising a transversal brace connecting said walls, a rotatable shaft passing through said brace and mounted upon said floor, a stationary gear mounted upon said floor, another stationary gear mounted upon said brace; said shaft passing centrally through said gears, a gear rigidly mounted upon said shaft, a drum upon said shaft positioned between said first named gear and said gear upon the shaft, another drum upon said shaft positioned between said second named gear and the gear upon said shaft, said drums being adapted for upright shifting movement upon said shaft, internal gears in said drums for selectively engaging said gear upon the shaft and said stationary gears, means associated with each drum for shifting each drum in or out of engagement with said gear on the shaft, a cable upon said first named drum connecting with the ailerons, a second cable upon the same drum connecting with said rudder, said two cables being adapted to steer the aeroplane in horizontal plane on rotating said shaft when said drum remains in engagement with said gear on the shaft, and cable upon said second named drum connected to the rear planes of the aeroplane to steer the aeroplane on vertical plane when said second named drum remains in engagment with said gear on the shaft.

2. In an aeroplane having independent means for controlling the flight in vertical and horizontal directions, a single rotatable control element for said independent means, and foot operated means whereby said independent means may be selectively or simultaneously operated by said control element.

3. In an aeroplane having independent axially alined rotatable means for controlling the flight in vertical and horizontal directions, a single rotatable control element for said independent means, means whereby said independent means may be selectively and simultaneously operated by said control element, and means for locking said control element in a predetermined set position.

4. In an aeroplane having independent axially alined rotatable means for controlling the flight in vertical and horizontal directions, a single rotatable control element for said independent means, and means tending to hold both of said independent means in operative engagement with said control element, and means associated with each of said independent means for disengaging the same from said rotatable control element.

5. In an aeroplane having independent means for controlling the flight in vertical and horizontal directions, respectively, a single rotatable control element for said independent means, and means tending to hold both of said independent means in operative engagement with said control element, means associated with each of said independent means for disengaging the same from said rotatable control element, and locking means associated with each of said independent means and effective on disengagement of the same from said control element.

6. In an aeroplane having independent means for controlling the flight in vertical and horizontal directions, respectively, a single control element for said independent means, and means tending to hold both of said independent means in operative engagement with said control element, and means associated with each of said independent means for disengaging the same from said control element.

7. In an aeroplane having independent means for controlling the flight in vertical and horizontal directions, a single control element for said independent means, and means for actuating said independent means to and from engagement with said control element, and holding means engaging each of said independent means on disengagement of the same from said control element.

8. In an aeroplane having independent means for controlling the flight in vertical and horizontal directions, a single control element for said independent means, and means for actuating said independent means to and from engagement with said control element, holding means engaging each of said independent means on disengagement of the same from said control element, and means for locking said control element in a set position.

9. In an aeroplane having independent means for controlling the flight in vertical and horizontal directions, the combination of a single control element comprising a rotatable shaft, a gear keyed thereon, an actuating member for each independent means and loose on said shaft at either side of said gear and having teeth engageable with said gear, means tending to hold said actuating members in engagement with said gear, means for disengaging said actuating members from said gear and locking the same against rotation, and means for locking said shaft in a set position.

10. In an aeroplane having independent means for controlling the flight in vertical and horizontal directions, the combination of a single control element comprising a rotatable shaft, a gear keyed thereon, an actuating member for each independent means and loose on said shaft at either side of said gear and having teeth engageable with said gear, and means for disengaging said actuating members from said gear and locking the same against rotation.

11. In an aeroplane having independent means for controlling the flight in vertical and horizontal directions, the combination of a single control element comprising a rotatable shaft, a gear keyed thereon, an actuating member for each independent means and loose on said shaft at either side of said gear and having teeth engageable with said gear, means for disengaging said actuating members from said gear and locking the same against rotation, and means for locking said shaft in a set position.

In testimony whereof I affix my signature.

ANDREW KOLODY.